United States Patent [19]

Crane

[11] Patent Number: 4,584,654

[45] Date of Patent: Apr. 22, 1986

[54] METHOD AND SYSTEM FOR MONITORING OPERATING EFFICIENCY OF PIPELINE SYSTEM

[75] Inventor: Harold E. Crane, River Ridge, La.

[73] Assignee: Ultra Products Systems, Inc., New Orleans, La.

[21] Appl. No.: 435,648

[22] Filed: Oct. 21, 1982

[51] Int. Cl.⁴ .............................................. G01L 3/26
[52] U.S. Cl. ..................................... 364/550; 73/112; 364/551
[58] Field of Search ................................. 73/112, 168; 324/158 MG; 364/492, 493, 510, 511, 550, 551, 552; 374/39; 361/30, 79; 417/19, 63

[56] References Cited

U.S. PATENT DOCUMENTS

| | | | |
|---|---|---|---|
| 1,633,786 | 6/1927 | Horter | 417/19 |
| 2,651,995 | 9/1953 | Blackburn | 417/19 |
| 3,068,796 | 12/1962 | Pfluger et al. | 417/19 X |
| 3,285,057 | 11/1966 | Zurik | 73/59 |
| 3,998,093 | 12/1976 | Bertolasi | 73/112 |
| 4,120,033 | 10/1978 | Corso et al. | 417/63 X |
| 4,179,611 | 12/1979 | Mill et al. | 364/550 X |
| 4,286,324 | 8/1981 | Ingram | 73/114 X |
| 4,325,128 | 4/1982 | Abnett et al. | 72/112 X |
| 4,330,237 | 5/1982 | Battah | 364/551 X |
| 4,334,425 | 6/1982 | Crane | 73/112 |
| 4,410,950 | 10/1983 | Toyoda et al. | 364/551 |

Primary Examiner—Gary Chin
Assistant Examiner—Edward R. Cosimano
Attorney, Agent, or Firm—Schwartz, Jeffery, Schwaab, Mack, Blumenthal & Evans

[57] ABSTRACT

A method and system are disclosed for monitoring the operating status of a materials distribution network having a distribution pipeline and a plurality of pumping stations located at spaced intervals along the pipeline for pumping material through the pipeline, wherein each station includes one or more pumps connected to the pipeline and one or more motors having shafts connected respectively to the pumps for operating the pumps. A plurality of primary input parameters at each of the pumping stations are sensed, including the shaft speed of each of the motors, the output torque of each of the motors, and the energy input to each of the motors. A plurality of values including the power produced by each of the motors, and the operating efficiency of each of the motors are calculated from the input parameters. The calculated efficiency values are displayed for operator use. The economic and financial savings or losses are calculated for management use.

21 Claims, 2 Drawing Figures

METHOD AND SYSTEM FOR MONITORING OPERATING EFFICIENCY OF PIPELINE SYSTEM

BACKGROUND OF THE INVENTION

1. Field of the Invention

This invention relates to a system for monitoring the operating efficiency of pipelines and pipeline pump stations.

2. Discussion of Related Art

In order to transport materials such as oil, coal, water, and natural gas over large distances, pipeline distribution systems are used which comprise a plurality of pipeline pumping stations spaced along a long pipeline through which the fluid is passed. Each pipeline pumping station normally consists of a number of pumping units wich may be of different sizes or capacity. These pumping units are sometimes individually connected for use and are controlled to maintain the flow rate through the pumping station as close as possible to a desired level. Optimally, each pumping station adds a predetermined amount of hydraulic power to the pipeline in order to maintain the desired flow rate.

In the past, the operation of starting and stopping the pumping units at a pumping station has been done manually by an operator or by remote control from a master station. This method of control has been improved upon by the advent of automatic controllers, such as that shown in U.S. Pat. No. 3,068,796 to Pfluger et al. The Pfluger et al·system automatically starts and stops pumping units in a pumping station in order to maintain the power level of the pump station at the power level set either by remote or local commands.

However, even with the use of automatic controllers, difficulties exist when trying to transport materials over a large distance at an economical rate. For example, in the controller of Pfluger et al, emphasis is placed on single elements and control is effected assuming that average parameters are the same as instantaneous values, and that loading is shared equally. However, in actual fact, instantaneous parameters may fluctuate greatly thus severely reducing the overall efficiency of a pumping station. The material being transported is normally distributed at a high pressure and, therefore, transmits forces among the pumping units of the station. Consequently, each pumping unit may be operating at conditions which are different from the average obtained by measuring the total throughput of the station or from time averaged parameters for the individual units. This problem is further compounded by the possiblity of resonant interaction among pumping station components. Large instantaneous excursions can develop and persist until damage to elements of the station occurs. Even if such damage does not occur, such fluctuations and oscillations can result in an average operating efficiency which is substantially below that which is optimal, even though the pumping station is operating at a desired power level. Also, the total load of the pumping station may not be equally shared among the pumping units. This results in the different pumping units operating at different efficiency levels thus causing a still greater decrease in operating efficiency.

Various systems are known for monitoring the operation of mechanical components. For example, U.S. Pat. No. 4,286,324 to Ingram shows a system for controlling the power transmitted through a rotating shaft. U.S. Pat. No. 3,988,093 to Bertolasi shows an energy monitoring system which is used to monitor the gas or electrical energy consumed by a factory or the like. U.S. Pat. No. 3,285,057 shows an apparatus for measuring the torsional reaction of a fluid on a rotating shaft.

Also, my own U.S. Pat. No. 4,334,425, issued June 15, 1982, shows a system for analyzing the efficiency of power plants, and especially marine power plants.

However, none of the known systems is adapted specifically for use in a material pipeline distribution system for identifying the unique problems encountered in such a system. The present invention is an improvement upon my aforementioned U.S. Pat. No. 4,334,425 adapted specifically for use in a pipeline distribution system. However, many of the components of my aforementioned patent can be used directly in the present invention, and the disclosure of my aforementioned patent is incorporated by reference herein for the purpose of further explanation of these components.

SUMMARY OF THE INVENTION

One object of the present invention is to provide a monitoring system and method for a distribution network wherein components of each pumping station can be monitored individually and wherein easily readable and usable information relating to the operation of each component is made available to a station operator.

Another object of the present invention is to provide a system and method for monitoring distribution networks wherein operating data indicative of optimum operating characteristics for components of each pumping station are stored and compared to real time operating characteristics to provide efficiency ratings for each of the components of each pumping station.

Yet another object of the present invention is to provide a system and method for monitoring a pipeline distribution network wherein the operating characteristics of each component of a pumping station are compared to similar operating characteristics of other units of the pumping station in order to identify units which are operating abnormally.

Another object of the present invention is to provide a system and method for monitoring pipeline distribution networks wherein each pumping station of the distribution network is monitored individually and data indicative of the overall operating characteristics of each station are displayed at a central location for use by an operator.

Another object of the present invention is to provide a system and method for monitoring pipeline distribution networks wherein an efficiency rating for each of the pumping stations is calculated and displayed for use by an operator.

A further object of the present invention is to provide a system and method for monitoring pipeline distribution networks wherein the data collected are used to calculate for management the financial and economic benefits derived from a more efficient operation of the system, and furthermore, the financial penalties resulting from degradation or continued inefficient operation.

Another object of the present invention is to provide a monitoring system and method for pipeline distribution networks wherein the operating characteristics of each pumping station are compared to the other pumping stations to indicate abnormalities in one of the stations.

A further object of the present invention is to provide a monitoring system and method for pipeline distribution networks wherein values relating to instantaneous operating parameters can be displayed and stored to provide information concerning short term excursions of the network components.

In accordance with the above and other objects, the present invention is a method for monitoring the operating status of a distribution system having a distribution pipeline and a plurality of pumping stations located at spaced intervals along the pipeline for pumping materials through the pipeline. Each of the stations comprises a plurality of pumps connected to the pipeline, and a plurality of motors connected respectively to the pumps for operating the pumps. The method includes the step of sensing a plurality of primary input parameters at each of the pumping stations. The primary input parameters include the shaft speed of each of the motors, the output torque of each of the motors, the energy input to each of the motors, the input pressure and temperature to each of the pumps, and the output pressure and temperature of each of the pumps. From the primary input parameters, a plurality of values indicating the operating condition of the motors and pumps are produced. These values include the power produced by each of the motors, the operating efficiency of each of the motors determined by the power produced expressed in terms of energy input to each motor, and the operating efficiency of each motor and pump combination expressed by the fluid throughput of each pump in terms of energy input to the motor driving that pump. The calculated values are then displayed for use by an operator.

The overall operating efficiency of each of the pumping stations is also calculated and expressed by the total power produced by the motors of that station in terms of the total energy input to the motors.

The overall efficiency of each station is furthermore calculated and expressed as total throughput of each station in terms of total energy input to each station.

Optimum operating characteristics for each of the calculated efficiencies are stored and compared to the calculated efficiencies and displayed to provide an operator with an accurate indication of the relative operating condition of each of the units of a pumping station and the overall condition of the pumping station.

The data collected are also used to calculate for management the financial and economic benefits derived from a more efficient operation of the system and the financial penalties resulting from degradation or continued inefficient operation.

Also, each of the calculated efficiencies is compared to a similar calculated efficiency from one of the other motors, motor pump combinations or pumping stations and the results are displayed to provide an operator with an indication of the relative state of each unit of the total system.

DESCRIPTION OF THE PREFERRED EMBODIMENT

Figure 1:
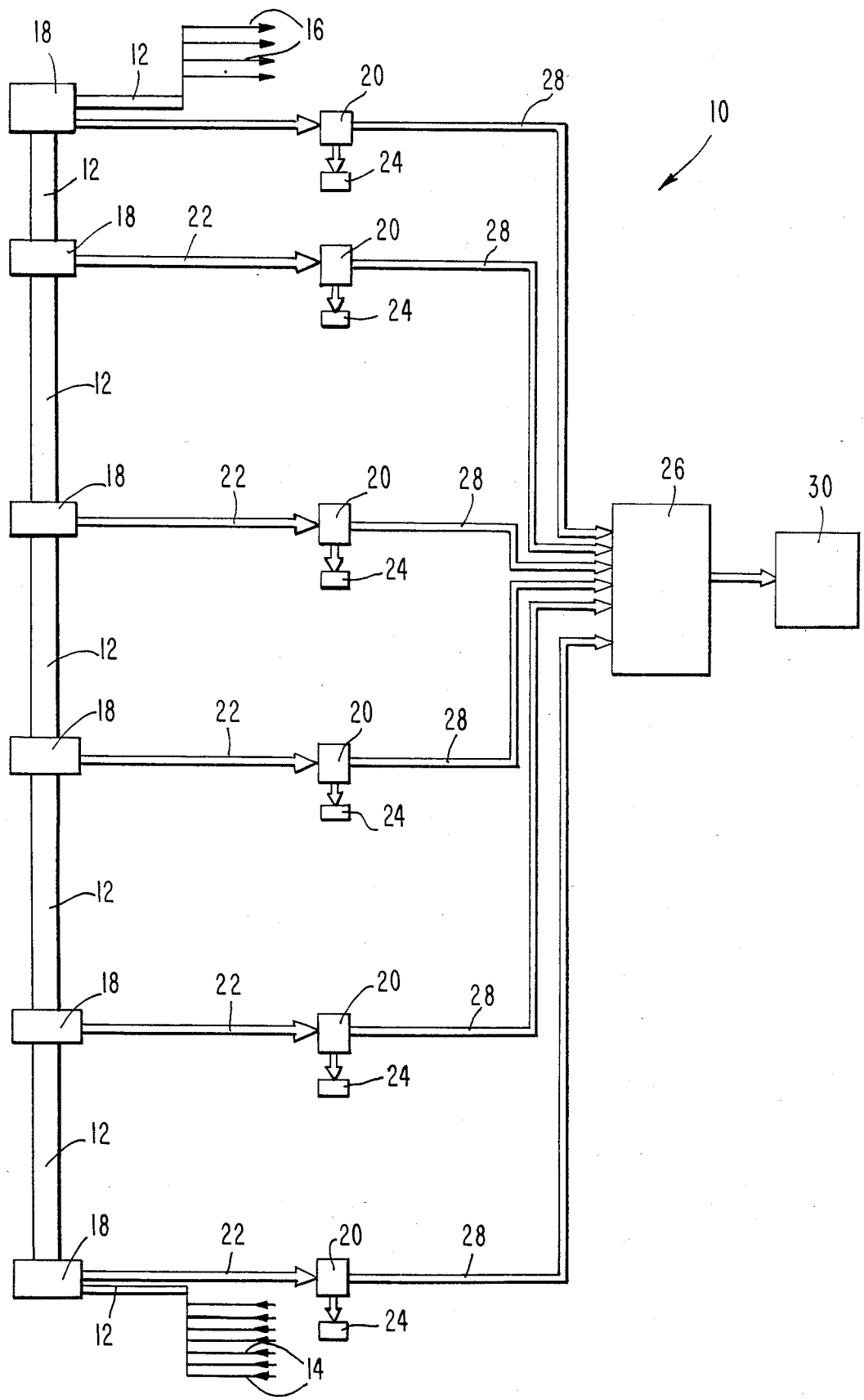
FIG. 1 is a block diagram showing a pipeline distribution network connected to a monitoring system according to the present invention.

FIG. 1 shows the monitoring system 10 connected to a fluid distribution network comprising pipeline 12 connected to inlet lines 14 and outlet lines 16. Pumping stations 18 are spaced at intervals along pipeline 12 in order to provide sufficient fluid power to ensure the progress of the fluid through pipeline 12.

Inlet lines 14 can be individual connector pipes which extend from gas or oil wells, coal mines or the like. Each of the inlet pipes 14 is connected through an appropriate header or the like to pipeline 12. Similarly, each of the outlet lines 16 can be connected from an appropriate header attached to pipeline 12. Outlet lines 16 are connected to further distribution networks, or directly to customers for receiving natural gas, or the like.

Pumping stations 18 contain a plurality of individual pumping units, each of which comprises a pump and a motor, such as an electric motor of fuel operated prime mover, as will be discussed in further detail hereinafter. Clearly, in order for the fluid being pumped through pipeline 12 to flow smoothly and efficiently from inlet lines 14 to outlet lines 16, each pumping station 18 must add a predetermined amount of hydraulic power to the fluid. If any one of the pumping stations 18 operates incorrectly, the entire distribution network can be adversely affected both as to the net amount of fluid transferred through the pipeline and in terms of the efficiency with which the fluid is being transferred. Because each pumping station 18 contains a plurality of pumping units, it is not necessary that the entire station break down for a net loss of efficiency to occur. If the pumping units within the station are not effectively controlled, the flow of fluid through that particular station can be adversely affected thus reducing the efficiency of the entire network.

If a reduction in efficiency occurs, it should be corrected as quickly as possible. However, such a reduction in efficiency is not always completely apparent. The pumping units of each pumping station may appear to be operating correctly when in fact, due to, for example, resonant interaction between the individual pumps of the station, the operating efficiency of the station is lower than it should be. Accordingly, essential instantaneous parameters within the pumping station must be continuously monitored on a real time basis. For this purpose, the monitoring system 10 includes a microprocessor 20 associated with each pumping station 18. Each microprocessor 20 receives a plurality of input signals on a data bus 22 which connects a plurality of sensors in the pumping station to the associated microprocessor. Each microprocessor 20 has input/output peripheral equipment 24 associated with it for displaying the results of calculations performed by the microprocessor directly at the associated pumping station 18. The input/output peripheral equipment 24 also includes a hard copy printer to make a record of operations at the station and a disk for storing the information for later transmission to a central station. Also, an operator keyboard is included for inputting critical data to the microprocessor.

All data generated by the microprocessors 20 can be moved swiftly to a central location such as an operations office through a data bus 28 associated with the microprocessor. This data bus can include transmission over commercial telephone lines, microwave links, satellite links, or shortwave transmissions through the use of automatic modems within the system, as would be apparent to one of ordinary skill in the art. A central microprocessor 26 receives the information from each of the field located microprocessors 20. Microprocessor 26 receives instantaneous data concerning operating parameters being monitored, stores this data and performs valuable functions including trend analysis relative to each of the stations 18, produces meaningful reports on fuel use of each station, plant operations, and energy goals expected and achieved. Trends can be charted in graphics both on full color display or in hard copy form, as will be apparent to one of ordinary skill in the art.

Figure 2:
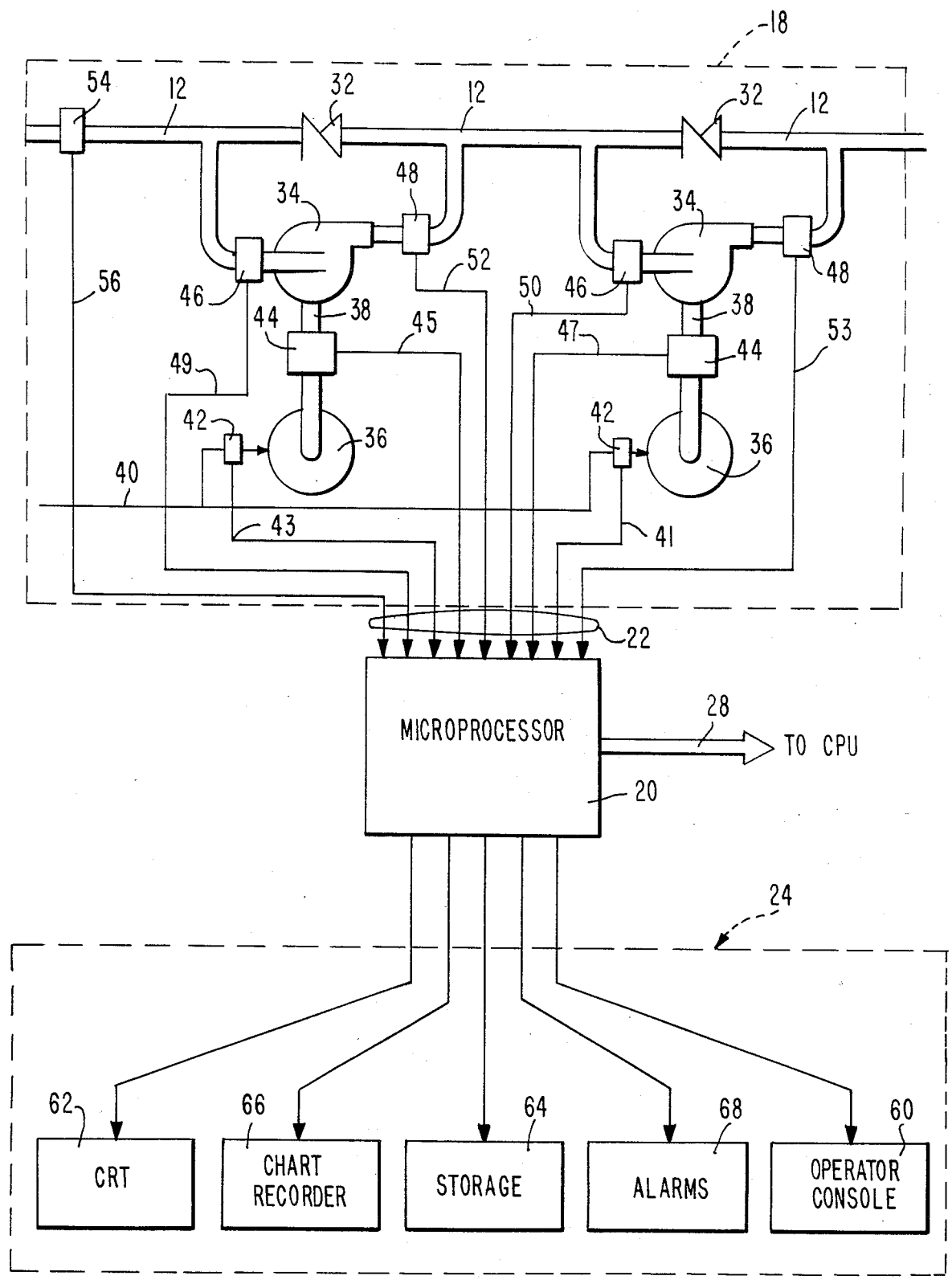
FIG. 2 is a schematic illustration showing the components of one pumping station connected to the monitoring system of the present invention.

FIG. 2 shows one pumping station 18 connected through a data bus 22 to a field located microprocessor 20. Pumping station 18 typically comprises check valves 32 and pipeline 12. Each check valve 32 is disposed between the inlet and outlet lines of a pump 34. Each pump 34 is operated by a pump motor 36 through a drive shaft 38. Pump motors 36 can be electric motors or fuel driven prime movers fed through a fuel line 40. While pumping station 18 is shown to contain two pumps 34, it will be understood that more than two such pumps can be contained in any single pumping station. Of course, each pump will be provided with a similar drive motor and check valve configuration.

The fuel fed to each prime mover 36 is sensed by a flow sensor 42 located in the fuel supply line. Flow sensors 42 provide signals proportional to gallons of fuel per hour or gallons of fuel per minute. These signals are supplied to microprocessor 20 through lines 41 and 43, respectively. Sensors 44 are mounted on output shafts 38 of the prime movers 36. Each sensor 44 provides a real time signal proportional to the torque transmitted through the connected shaft 38. These signals are sent to microprocessor 20 through lines 45 and 47, respectively. Each sensor 44 can be constructed as shown in my aforementioned U.S. Pat. No. 4,344,425 and comprises two prerecorded magnetic tapes which are mounted on the associated shaft 38. Each tape has a prerecorded sinusoidal signal on it and is disposed in operative engagement with a pair of playback heads which are mounted at 180° intervals on the shaft. Circuitry is provided which produces a signal indicative of the torque transmitted by the shaft by measuring the amount of twist in the shaft. The circuitry can also include a Schmidt trigger which provides a signal indicative of the shaft RPM.

In microprocessor 20, a direct reading of shaft horsepower for each motor 36 is obtained using the functions of shaft speed (RPM) and torque as determined by the formula:

$$\text{horsepower} = \frac{\text{torque (foot pound)} \times \text{RPM}}{5252}$$

At the inputs and outputs of pumps 34, sensors 46 and 48 are provided. Sensors 46 pass signals through lines 49 and 50, respectively, indicative of the input pressure and temperature of the fluid being introduced into the pumps. Sensors 48 pass signals through lines 52 and 53, respectively, indicative of the output pressures and temperatures of the fluid being pumped. With this information, microprocessor 20 can calculate the energy being delivered to the fluid in pipeline 12 by each pump 34. This quantity can be related to the fuel flow into motors 36 as measured by sensors 42 to provide an indication of the overall efficiency of each motor and pump combination.

Finally, a sensor 54 is provided in pipeline 12, which sensor senses the fluid flow through pipeline 12 and sends a signal through line 56 to microprocessor 20 indicative of this flow rate.

Microprocessor 20 calculates various values based on the sensed parameters. For example, the fuel consumed by each prime mover 36 is calculated based on the flow rate sensed by sensors 42 and based on the density of the fuel which can be input to the computer from operator console 60. The energy content of the fuel being used is also input to the computer and used to calculate the total energy value per unit of fuel fed to each prime mover 36. The power produced by each prime mover 36 is also calculated in accordance with the formula given above. Based on these calculations, the efficiency of each prime mover 36 is calculated by dividing the power output from each engine by the energy content of the fuel consumed by each prime mover. This calculated value is referred to as the prime mover operating efficiency. The operating efficiency of each prime mover 36 is displayed on a display device such as cathode ray tube 62. These operating efficiencies are also stored in a storage device 64 which can be a disk, tape, or the like. The stored efficiencies are used for monitoring long and short term trends in the operation of the prime movers. A printer 66 is also provided for producing a hard copy printout of the prime mover operating efficiencies over time.

The pressure and temperature signals from sensors 46 and 48 are used by microrocessor 20 to produce a calculated value indicative of the hydraulic power transmitted from each pump 34 to the fluid in pipeline 12. This calculated hydraulic power value is compared to the calculated energy value of the fuel being consumed by prime movers 36 to provide an overall efficiency for each prime mover 36 and pump 34 combination, i.e. each pumping unit.

Furthermore, the total power produced by pumping station 18 can be determined by adding together the amount of power produced by each prime mover 36. An overall station operating efficiency can be calculated by dividing the total power by the total amount of fuel consumed by each of the prime movers 36. In a similar manner, the total hydraulic power transmitted to the fluid in pipeline 12 can be calculated and a total hydraulic power efficiency can be calculated by dividing the total hydraulic power by the total fuel consumed by prime movers 36. All of these values can be displayed on CRT 62, printed by printer 66 and stored for future reference by storage device 64, as would be apparent to one of ordinary skill in the art.

The instantaneous sensed values are also directly stored by the monitoring system of the present invention. For example, the torque output of each prime mover 36 and the pressure differential produced by each pump 34 are recorded on chart recorder 66. Short term variations in the torque or pressure outputs would be immediately apparent by viewing the recorded values. A cyclic variation would be indicative of resonant interaction between the pumps of a pumping station and, once identified, appropiate action could be taken to eliminate such interactions. The instantaneous values can be used in conjunction with the efficiency values. If, for example, the power level produced by the station is correct, but the operating efficiency is low, the various instantaneous values can be checked individually to determine the cause of the reduced efficiency. If the reduction in efficiency is the result of resonant interactions between components, for example, the cyclic variations causing the problem would be readily apparent.

Alarms 68 are also provided. Microprocessor 20 monitors critical sensed values, such as torque, and compares these values against predetermined alarm limits. If, for example, the torque output of one prime mover 36 falls below a predetermined limit, an alarm can be sounded and/or the prime mover 36 involved can be shut down by the microprocessor 20.

Optimum operating conditions for each of the components of station 18 can be obtained from manufacturer specifications or from preliminary trial runs of the components. These optimum operating values are stored in storage device 64 and compared against the actual operating parameters which are calculated or measured directly from the system components. For example, the operating efficiency of each prime mover 36 is compared against the optimum operating efficiency stored in a storage device 64. The resultant value, referred to as the efficiency rating, is displayed on CRT 62 so that an operator will realize that a particular prime mover needs to be serviced or adjusted when its operating efficiency deviates from the optimum by greater than a predetermined amount.

Also, in order to identify abnormalities within components of the system as being related only to those components or as being related to the overall system operation, the calculated efficiency of each component is compared in microprocessor 20 to the calculated efficiency of each of the other components within the station 18. If it appears that all of the efficiencies for a similar component are approximately equal yet below the optimum operating efficiencies for that type of component, a generic cause for the abnormality can be sought. Such a cause may be related to improper operation of another of the pumping stations connected to pipeline 12.

As depicted in FIG. 1, each microprocessor 20 is connected through a data bus line 28 to a centrally located microprocessor 26. Microprocessor 26 receives each of the sensed and calculated parameters relating to each pumping station 18. Microprocessor 26 communicates with input/output peripheral equipment 30 which includes a CRT, a chart recorder, storage devices such as floppy disks and a tape drive, alarms, and an operator's console similar to those connected to microprocessor 20. Microprocessor 26 serves to provide a centralized output of each of the sensed and calculated parameters so that an operator can monitor the operation of all of the pumping stations 18 from a central location.

Also, microprocessor 26 is programmed to compare the overall efficiencies calculated for each pumping station 18 to the other pumping stations in order to identify pumping stations which operate abnormally relative to the other stations on the same pipeline. This information is useful in determining whether one or more individual pumping stations are operating inefficienctly, or whether the operating characteristics of the entire system are such that all of the pumping stations operate at lower than ideal efficiencies.

The data derived are also used for calculating for management the financial and economic benefits derived from a more efficient operation of the system and the financial penalties resulting from degradation or continued inefficient operation.

As will be readily understood from the foregoing, the present invention provides a method whereby instantaneous values of critical operating parameters are monitored and used directly to indicate the instantaneous condition of the components monitored, stored to provide data relative to short term excursions of the operating parameters, and used to calculate values indicative of other operating cheracteristics as well as operating efficiencies. The directly sensed values can be used in conjunction with the calculated values to identify operating abnormalities having both long and short term characteristics, with the result that the distribution network being monitored will operate at a more optimally efficient level.

The foregoing description is set forth for the purpose of illustrating the invention but is not deemed to limit the invention in any way. Numerous additions or other modifications may be made to the present invention by one of ordinary skill in the art without departing from the scope thereof as set forth in the appended claims.

What is claimed is:

1. A method for monitoring the operating status of a materials transport system having a distribution pipeline and a plurality of pumping stations located at spaced intervals along said pipeline for pumping materials through said pipeline, each of said stations comprising a plurality of pumps connected to said pipeline and a plurality of motors having shafts connected respectively to said pumps for operating said pumps, said method comprising:

sensing a plurality of primary input parameters at each of said pumping stations, including substantially simultaneously sensing the shaft speeds of said motors, substantially simultaneously sensing the output torques of said motors, and substantially simultaneously sensing the energy inputs to said motors;

calculating from said primary input parameters a plurality of values including calculating the power produced by each of said motors, and calculating the operating efficiency of each of said motors in terms of power produced and energy input;

comparing the calculated efficiencies of each of said motors of a station with the other motors in the same station to determine which motors are operating more inefficiently than the others; and displaying at least the result of said comparison.

2. The method as set forth in claim 1, and further wherein said step of sensing includes sensing the total throughput of each station and said step of calculating includes calculating the overall operating efficiency of each of said stations in terms of total energy input to said motors of each station and total fluid material throughput of each station.

3. The method as set forth in claim 1, and further including the step of storing optimum values of each of said calculated efficiencies, and comparing said calculated efficiencies to said stored optimum values, and displaying the result of said comparison.

4. The method as set forth in claim 1, wherein said step of sensing comprises sensing the temperature of said material at the input and output of each of said pumps, and displaying said sensed temperature.

5. The method of claim 1, and further including the step of calculating from said primary input parameters the financial and economic benefits derived from a more efficient operation of the system and the financial and economic penalties resulting from degradation or continued inefficient operation.

6. The method as set forth in claim 1, and further including the step of calculating the overall operating efficiency of each of said stations in terms of total energy input to said motors of each station and total power produced by said motors of each station.

7. The method as set forth in claim 6, and further including the step of comparing the calculated efficiency for each of said stations with the calculated efficiencies of the other stations to determine which of said stations is operating more inefficiently than the others.

8. The method as set forth in claim 1, wherein said step of sensing includes the step of sensing input and output pressures and temperatures to each of said pumps, and the step of calculating includes calculating the hydraulic power produced by each of said pumps.

9. The method as set forth in claim 9 and further wherein the step of calculating includes calculating the overall efficiency for each of said motor and pump combinations in terms of hydraulic power produced by the pump of the combination in terms of energy input to the motor of the combination.

10. A system for monitoring the operating status of a fluid distribution network having a distribution pipeline and a plurality of pumping stations located at spaced intervals along said pipeline for pumping fluid through said pipeline, each of said stations comprising a plurality of pumps connected to said pipeline and a plurality of motors having shafts connected respetively to said pumps for operating said pumps, said system comprising, for each station:

means for sensing a plurality of primary input parameters, including means for substantially simultaneously sensing the shaft speeds of said motors, means for substantially simultaneously sensing the output torques of said motors, and means for substantially simultaneously sensing the energy inputs to said motors;

a computer programmed for calculating from said primary input parameters a plurality of values including the power produced by each of said motors, and the operating efficiency of each of said motors in terms of power produced and energy input;

means for comparing the operating efficiency of each motor with the operating efficiency of the other motors of the same station to determine which motors are operating more inefficiently; and means for displaying at least the result of said comparison.

11. The system as set forth in claim 10 and further including means for sensing the total station throughput and wherein said computer is programmed for calculating the overall operating pumping station efficiency in terms of total energy input to said motors of said station and total fluid throughput of said station.

12. The system as set forth in claim 10, and further including means for storing optimum values of each of said calculated efficiencies, and wherein said computer is programmed for comparing said calculated efficiencies to said stored optimum values; and means for displaying the result of said comparison.

13. The system as set forth in claim 10 and further wherein said computer is programmed to calculate the financial and economic benefits derived from a more efficient operation of the system and the financial penalties resulting from degradation or continued inefficient operation.

14. The system as set forth in claim 10 and further wherein said computer is programmed for calculating the overall operating efficiency of each of said stations in terms of total energy input to said motors of each station and total power produced by said motors of each station.

15. The system as set forth in claim 14 and further including an additional computer connected to receive data from the computer of each of said stations and being programmed for comparing the calculated efficiency for each of said stations with the calculated efficiencies of the other stations to determine which of said stations is operating more inefficiency than the others.

16. The system as set forth in claim 10, including means for sensing input and output pressures to each of said pumps, and wherein said computer is programmed for calculating the hydraulic power produced by each of said pumps.

17. The system as set forth in claim 16 and further wherein said computer is programmed for calculating the overall efficiency for each of said motor and pump combinations in terms of hydraulic power produced by the pump of the combination in terms of energy input to the motor of the combination.

18. A method for monitoring the operating status of a material transport system having a distribution pipeline and a plurality of pumping stations located at spaced intervals along said pipeline for pumping materials through said pipeline, each of said stations comprising a plurality of pumps connected to said pipeline and a plurality of motors having shafts connected respectively to said pumps for operating said pumps, said method comprising:

substantially simultaneously sensing a plurality of primary input parameters at all of said pumping stations, including sensing parameters for calculating the total throughput of each station, sensing parameters for calculating the total energy input to each station, and sensing parameters for calculating the energy output of each of said stations;

calculating from said primary input parameters the overall operating efficiency of each of said stations in terms of total energy input and total throughput of each station;

comparing the calculated efficiencies of each of said station with the calculated efficiencies of the other stations of said system to determine which station is operating more inefficiently than the others; and displaying the result of said comparison.

19. A system for monitoring the operating status of a fluid distribution network having a distribution pipeline and a plurality of pumping stations located at spaced intervals along said pipeline for pumping fluid through said pipeline, each of said stations comprising a plurality of pumps connected to said pipeline and a plurality of motors having shafts connected respectively to said pumps for operating said pumps, said system comprising, for each station:

means for substantially simultaneously sensing a plurality of primary input parameters at all of said pumping stations, including means for sensing parameters for calculating the energy input to each of said stations, means for sensing parameters for calculating the energy output by each of said stations, and means for sensing parameters for calculating the total throughput for each of said stations;

means for calculating from said primary input parameters the overall operating pumping station efficiency for each of said stations in terms of total energy input and total throughput;

means for comparing the operating efficiency of each of said station with the operating efficiencies of the other stations to determine which station is operating less efficiently than the other stations; and means for displaying the result of said comparison.

20. A method for monitoring the operating status of a materials transport system having a distribution pipeline and a plurality of pumping stations located at spaced intervals along said pipeline for pumping materials through said pipeline, each of said stations comprising a plurality of pumps connected to said pipeline and a plurality of motors having shafts connected respectively to said pumps for operating said pumps thereby forming a plurality of pump/motor combinations, said method comprising:

sensing a plurality of primary input parameters at each of said pumping stations, including, at each of said pumping stations, substantially simultaneously sensing parameters for calculating the energy input to each motor/pump combination and sensing parameters for calculating the energy transferred from each pump to material in said pipeline;

calculating the energy input to each of said motor/pump combinations and the energy output from each of said motor/pump combinations, and calculating the operating efficiency of each motor/pump combinations;

comparing the calculated efficiencies of each motor/pump combination of a station with the efficiency of other motor/pump combinations of the same station to determine which motor/pump combinations are operating more inefficiently than others; and displaying the result of said comparisons.

21. A system for monitoring the operating status of a fuel distribution network having a distribution pipeline and a plurality of pumping stations located at spaced intervals along said pipeline for pumping fluid through said pipeline, each of said stations comprising a plurality of pumps connected to said pipeline and a plurality of motors having shafts connected respectively to said pumps for operating said pumps thereby forming a plurality of motor/pump combinations, for each station:

means for sensing a plurality of primary input parameters including substantially simultaneously sensing parameters for calculating the energy input to each of said motors and parameters for calculating the energy transferred from each of said pumps to the material in said pipeline;

means for calculating the energy input to each of said motors and the energy output from each of said pumps and for calculating the operating efficiency of each of said motor/pump units based on said energy calculation;

means for comparing the operating efficiency of each motor/pump combination of a station with the operating efficiency of the other motor/pump combinations of the same station to determine which motor/pump combinations are operating more inefficiently; and means for displaying the result of said comparison.

* * * * *